US007110858B2

(12) United States Patent
Pisarsky

(10) Patent No.: US 7,110,858 B2
(45) Date of Patent: Sep. 19, 2006

(54) OBJECT IDENTIFICATION USES PREDICTION OF DATA IN DISTRIBUTED NETWORK

(75) Inventor: Vladimir R. Pisarsky, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1124 days.

(21) Appl. No.: 09/829,520

(22) Filed: Apr. 9, 2001

(65) Prior Publication Data

US 2002/0147838 A1 Oct. 10, 2002

(51) Int. Cl.
*G06F 15/173* (2006.01)
*H04L 9/00* (2006.01)
*G06F 7/04* (2006.01)

(52) U.S. Cl. ............... 700/238; 713/161; 713/170; 726/4; 726/9

(58) Field of Classification Search ............... 709/238, 709/239, 240; 370/351, 352, 395.31, 395.32; 726/4, 9; 713/160, 161, 166, 168–172
See application file for complete search history.

(56) References Cited

U.S. PATENT DOCUMENTS

| | | | | |
|---|---|---|---|---|
| 4,995,082 A * | 2/1991 | Schnorr | ............... | 713/169 |
| 5,509,073 A * | 4/1996 | Monnin | ............... | 380/229 |
| 5,581,615 A * | 12/1996 | Stern | ............... | 713/180 |
| 5,633,932 A * | 5/1997 | Davis et al. | ............... | 713/176 |
| 5,689,566 A * | 11/1997 | Nguyen | ............... | 713/155 |
| 5,692,124 A * | 11/1997 | Holden et al. | ............... | 713/201 |
| 5,887,065 A * | 3/1999 | Audebert | ............... | 713/172 |
| 5,908,469 A * | 6/1999 | Botz et al. | ............... | 726/4 |
| 5,923,645 A * | 7/1999 | Okuda et al. | ............... | 370/232 |
| 6,092,191 A * | 7/2000 | Shimbo et al. | ............... | 713/153 |
| 6,115,393 A * | 9/2000 | Engel et al. | ............... | 370/469 |
| 6,125,457 A * | 9/2000 | Crisan et al. | ............... | 714/36 |
| 6,185,680 B1 * | 2/2001 | Shimbo et al. | ............... | 713/160 |
| 6,185,682 B1 | 2/2001 | Tang | | |
| 6,272,639 B1 * | 8/2001 | Holden et al. | ............... | 726/12 |
| 6,363,429 B1 * | 3/2002 | Ketcham | ............... | 709/235 |
| 6,389,543 B1 * | 5/2002 | Dawson et al. | ............... | 726/4 |
| 6,442,525 B1 * | 8/2002 | Silverbrook et al. | ............ | 705/1 |
| 6,711,408 B1 * | 3/2004 | Raith | ............... | 455/440 |
| 6,978,223 B1 * | 12/2005 | Milliken | ............... | 702/182 |

FOREIGN PATENT DOCUMENTS

EP          0 792 044          8/1997

OTHER PUBLICATIONS

Clarke et al. "Introduction to Chip-Cards and Smart Cards" Principal, Xamax Consultancy Pty Ltd, May 1998.*
Elliot et al. "Smart-card based Electronic Commerce: Characteristics and Roles", IEEE Proceedings, Jan. 6-9, 1998.*
Bush et al. "Active Virtual Network Management Protocol" IEEE Workshop on Parallel and Distributed Simulation, 1999.*
Reiter et al. "Resilient Authentication Using Path Independence", Dec. 1998, IEEE Transactions on Computers, vol. 47 No. 12, pp. 1351-1362.*
Menezes et al.: "Identification and Entity Authentication" Handbook of Applied Cryptography, CRC Press Series on Discrete Mathematices and Its Applications, Boca Raton, FL, CRC Press, US, 1997, pp. 385-424.

* cited by examiner

*Primary Examiner*—Thomas Pham
(74) *Attorney, Agent, or Firm*—Adam L. Stroud

(57) ABSTRACT

A measure of security is provided by determining authenticity of an object (e.g., credit card, cell phone, car keys, etc.) by letting the object predict at which nodes multiple specific data packets are going to be in a distributed network in the next time slot.

20 Claims, 1 Drawing Sheet

OBJECT IDENTIFICATION USES PREDICTION OF DATA IN DISTRIBUTED NETWORK

FIELD OF THE INVENTION

The invention relates to a secure identification protocol for determining authenticity of an object such as a credit card or other electronic legal tender, bank cards, cellphones, laptops, etc.

BACKGROUND ART

Web-based applications are flooding into areas that can benefit from enhanced security. Examples of such Web-based applications include: commercial transactions over the Internet (e.g., the purchase and sale of goods), on-line banking (e.g., electronic funds transfer), and medical transactions (e.g., provision of medical records in emergency situations), etc.

The security of information and transactions has been identified as a significant problem. At the center of the problem are crackers: individuals who seek to access computers, such as Web servers, so as to conduct pranks, vandalism, espionage or other illegitimate activities. Web security responds to these activities and, among other things, strives to maintain the confidentiality and integrity of information, both as resident on servers and as communicated in Web transactions. Increasing the vulnerability to crackers is that the Web is an open system available to anyone in possession of readily available, affordable technology.

An important security issue is authentication. While authentication takes various forms, authentication of individuals is particularly desirable. This authentication is directed to verifying that the individual seeking access to and/or through a server is in fact who that individual claims to be, and not an impersonator. This authentication relies on verification being performed at or above a predetermined minimum level of confidence. At the same time, authentication is generally an early hurdle that the individual must clear to conduct transactions with the server.

An example of an authentication tool is a token. The token is, e.g., a small handheld device or copy-protected software loaded onto a PC. Authentication tokens operate by query/response, time-based code sequences, or other techniques, such as lists of one-time-only passwords, etc. For example, it displays a constantly changing ID code that can be used to get access to a network or server. A user first enters a password and then the card displays an ID that is valid for logging on to a network until the ID changes, which can be every 5 minutes. The ID's usually are determined through a pseudo-random generator. Pseudo-random generators and algorithms to generate pseudo-random numbers are well known. The generator in the token is mirrored by a generator in the server or the network to ensure that the both agree on what is a valid ID for the time window considered.

The fact that the server and token operate in lock-step and each time produce the same ID the same time implies that the server and token are using identical algorithms. Servers can be hacked. The algorithm used by tokens commercially available in large batches from a manufacturer can be stolen or otherwise discovered, e.g., by disassembling a token. Moreover, the validity of the token is tied to a finite time window. Eavesdropping on the ID communication may enable an unauthorized person to ride piggyback on the authorized person in this window of opportunity to enter the secure server or network.

Accordingly, one could say that a need exists for alternative security measures, and methods to implement such measures. Moreover, a need exists for alternative authentication systems and methods.

SUMMARY OF THE INVENTION

The invention relates to a secure identification protocol for determining authenticity of an object, e.g., a credit card, a cellphone, building-access badges, car keys, etc., or any other object, including software. A distributed data processing system or network comprises a plurality of nodes that communicate with one another. Per object issued to the user, one or more associated itineraries are calculated in advance to let one or more token packets (data packets) be routed among these nodes. The calculated itineraries are preferably genuinely random. The itinerary is translated into instructions that are packaged within the associated packet, whereupon the itinerary calculations are destroyed. The issued object has, e.g., a smart card with an onboard time-table that has information about the itineraries of the packets. The time-table predicts, upon being queried, the location of one or more packets in the network in one or more future time slots. When the prediction is correct and supplied to the querying system, the system assumes the object is authentic. When the prediction is incorrect, the system assumes the object is not authentic or unauthorized.

Note that transactions made via telephones can easily be monitored, but that credit card numbers based on predicted itineraries are valid one time only. Eavesdropping on the call and extracting the information about the predicted token itinerary does not enable a cracker to abuse this information for a next transaction.

Practically, the network cannot be hacked to get the information to predict the itineraries associated with a specific object and thus to simulate authenticity. This is especially so if the prediction is tied to the itineraries of multiple packets. Itineraries are independent of one another, and even if one packet is intercepted and analyzed, its relationship with other packages cannot be gathered. The prediction can further be using a dynamically varying number of packets each time a prediction is requested.

In the known token-server scenario, wherein the ID generation is synchronized between token and server, each of them can be hacked and, at least in a simulation, be accelerated to generate ID's that are going to be used in the future. The network of nodes used in the invention cannot be hacked in practice due to its distributed character. An accelerated simulation is therefore practically impossible.

Yet another advantage of the invention is that the paths of the packets in the network can indeed be genuinely random. The path of a packet is determined in advance, e.g., using the white noise generated in a physical device. The path is represented in the packet by the instructions and in the predictor of the object as, e.g., a time schedule of events. In contrast, the token in the known scenario generates IDs according to a specific algorithm, and is synchronized with the server for comparison. As a result, the IDs in the latter scenario cannot be truly random.

BRIEF DESCRIPTION OF THE DRAWING

The invention is explained in further detail, by way of example and with reference to the accompanying drawing, wherein.

DETAILED EMBODIMENTS

Figure 1:
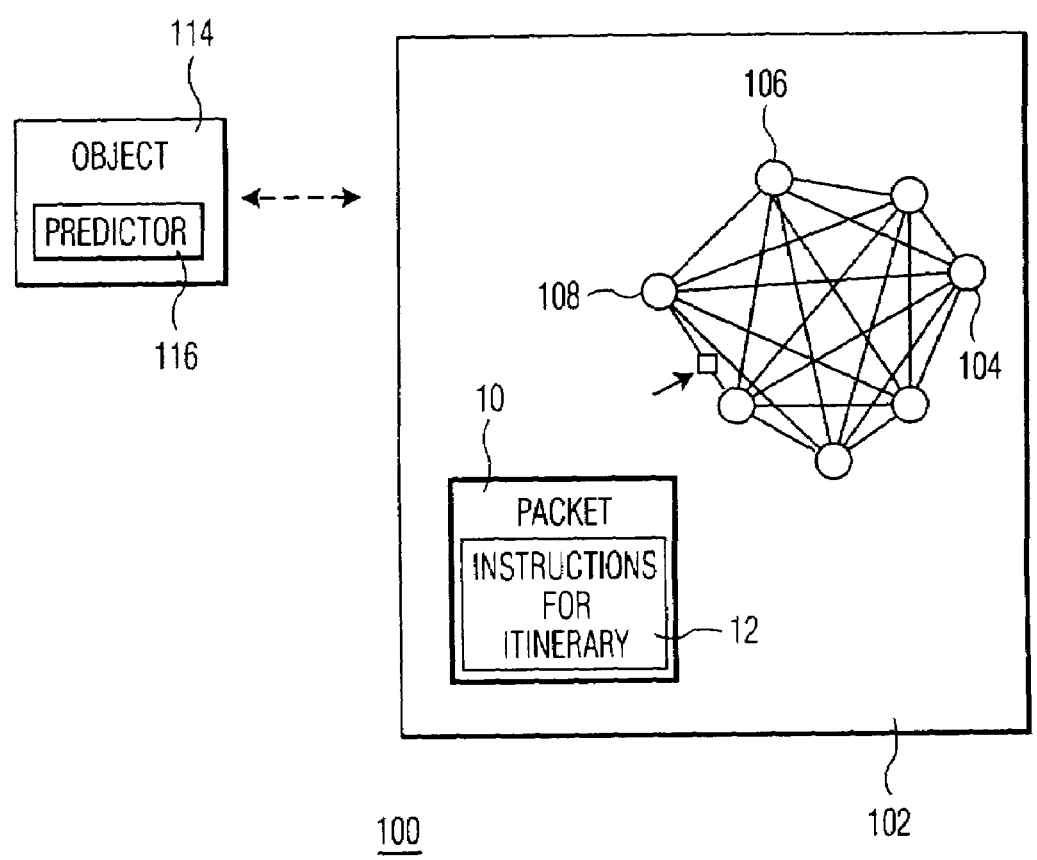
FIG. 1 is a block diagram of a system in the invention.

FIG. 1 is a block diagram of a system 100 in the invention. System 100 comprises a network 102 of nodes (e.g., servers) 104, 106, ..., 108. Preferably, nodes 104–108 form a geographically distributed data processing system, wherein different ones of nodes 104–108 reside at different geographic locations. Nodes 104–108 form the vertices of a graph that a data packet 110 traverses by hopping from one of nodes 104–108 to another under control of instructions 112 onboard of the packet.

Network 102 is shown here in this example as a fully connected configuration. That is, network 102 shows that each node is connected to all other nodes so that packet 110 can be programmed to get to any node from any node. The network neither needs to be fully connected nor needs it be static. As to the latter, the existence of a connection between two nodes may be made time dependent.

Instructions 112 determine a packet's itinerary across network 102. The itinerary has been calculated and mapped onto instructions 112 in advance, whereupon the calculations are destroyed. The instructions take the form of, for example, "Your next node is the one which is the second on your right". The semantic meaning of the clause "second on your right" is determined locally at the current node, and in this case depends on what has been defined as being "the second on your right" when taking the current node as the reference.

System 100 further comprises an object 114 (software or hardware) that has a predictor 116 that is onboard in this example. Predictor 116 generates a prediction of the whereabouts of one or more of a plurality of data packets, of which only a single one, packet 110, is shown in order to not obscure the drawing. Predictor 116 has, for example, a look-up table that lists per moment in time the nodes occupied by one or more packets. The look-up table is prepared in advance, and is to agree with the instructions 112 per relevant packet 110 per relevant moment in time. Accordingly, when the user of object 114 seeks access to a server that is covered by system 100 as a security measure, system 100 requests object 114 to predict the next location of one or more specific packets 110 in the network formed by nodes 104–108. If the prediction is correct, it is assumed that the user is authorized. If the prediction is incorrect, it is assumed that the user is not authorized.

The object authentication of the invention can be used in addition to other measures such as a password.

The quality of the security supplied by the invention depends on, among other things, the following. The prediction is given in advance and is preferably valid for only a very short time interval, too short for an eavesdropper to use it to get access, as the packets may have moved on and another prediction is required by the time the eavesdropper can react. Preferably, a duplicate prediction within the same time frame is intercepted by the system as comprising a prediction of an imposter. With enough nodes and enough packets there are enough combinations possible of unique predictions at any moment, e.g., in order to cover many different users, so as to be able to conclude that twice the same prediction requires a closer look, e.g., by requesting a next prediction from the same object. The distributed character of the network makes it practically impossible to get a snapshot of the locations of all packets. Hacking one node and intercepting a packet does not enable the hacker to infer to which object this packet was relevant and when. Hacking one node does not disclose whether or not there are more packages relevant to a prediction. The relationship between object and packet may vary over time. That is, one prediction may relate to a first group of packets, the next prediction may relate to a different group of packets. As a result of the distributed and dynamic character of the changing collection of packets following pseudo random paths, a high level of security is attained.

What is claimed is:

1. An authentication object, the authentication object for use in a transaction, the transaction being authenticated at least in part via an authentication network, and at least one data packet having an itinerary in the authentication network, the itinerary being pre-determined in the at least one data packet, the authentication object comprising a predictor, the predictor enabled to predict at least a part of the pre-determined itinerary of the at least one data packet in the authentication network.

2. The authentication abject of claim 1, wherein the predictor is implemented as logic circuitry that generates a prediction of one or both of (i) the node that the at least one data packet occupies and (ii) the next node that the at least one data packet will occupy.

3. The authentication object of claim 1, wherein the predictor is implemented as a look up table that contains, related to a time parameter, one or both of (i) the node that the at least one data packet occupies and (ii) the next node that the at least one data packet will occupy.

4. A method of determining authenticity of an authentication object, the authentication object being for use in a transaction, the transaction being authenticated at least in part via authentication network comprising plural nodes, and at least one data packet having an itinerary in the authentication network, the itinerary being pre-determined in the at least one data packet, the method comprising: receiving from the authentication object a prediction of at least a part of the pre-determined itinerary of the at least one data packet in the authentication network; and verifying the prediction.

5. The method of claim 4, wherein receiving a prediction comprises receiving a prediction as to one or both of (i) the node that the data packet occupies and (ii) the node that is the data packet's next destination.

6. The method of claim 4, wherein verifying the prediction comprises comparing the prediction against at least a part of the actual itinerary of the at least one data packet.

7. The method of claim 4, wherein verifying the prediction comprises comparing the prediction against one or both of (i) the node that the at least one data packet occupies and (ii) the next node that the at least one data packet will occupy.

8. The method of claim 4, further comprising exercising the at least one data packet's itinerary.

9. The method of claim 8, wherein exercising comprises having the at least one data packet occupy a pre-determined node of the authentication network at a particular time.

10. The method of claim 8, wherein exercising further comprises, after a transaction, having the at least one data packet occupy a pre-determined node of the authentication network for use in authenticating a subsequent transaction.

11. The method of claim 4, further comprising establishing an itinerary for the at least one data packet.

12. The method of claim 11, wherein establishing an itinerary for the at least one data packet comprises programming the at least one data packet.

13. The method of claim 11, wherein establishing an itinerary for the at least one data packet comprises calculating an itinerary, mapping the calculated itinerary onto one or more instructions and storing the one or more instructions in the at least one data packet.

14. The method of claim 4, further comprising receiving from the authentication object a prediction of at least a part of a pre-determined itinerary of a second data packet in an authentication network; and verifying the prediction.

15. The method of claim 14, wherein receiving and verifying as to a second data packet comprises receiving and verifying responsive to the transaction.

16. The method of claim 14, wherein receiving and verifying as to a second data comprises receiving and verifying responsive to a transaction subsequent to the transaction.

17. The method of claim 14, wherein receiving and verifying as to a second data packet comprises receiving and verifying using a second authentication network.

18. The method of claim 4, further comprising, keeping a prediction valid for a selected time frame.

19. The method of claim 18, further comprising rejecting authentication based on receipt, within the selected time frame, of a second prediction as to the at least one data packet.

20. The method of claim 19, wherein rejecting authentication comprises requesting another prediction as to the at least one data packet's itinerary.

* * * * *